(12) United States Patent
Simm et al.

(10) Patent No.: US 7,716,902 B2
(45) Date of Patent: May 18, 2010

(54) TRANSFER DEVICE ON A PACKAGING MACHINE AND METHOD FOR CONTROL THEREOF

(75) Inventors: Thorsten Simm, Karlsruhe (DE); Stefan Pötzsch, Rheinstetten (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 647 days.

(21) Appl. No.: 11/596,704

(22) PCT Filed: Apr. 5, 2006

(86) PCT No.: PCT/EP2006/003087

§ 371 (c)(1), (2), (4) Date: Nov. 16, 2006

(87) PCT Pub. No.: WO2006/111271

PCT Pub. Date: Oct. 26, 2006

(65) Prior Publication Data

US 2007/0227101 A1  Oct. 4, 2007

(30) Foreign Application Priority Data

Apr. 19, 2005 (DE) .................... 10 2005 017 961

(51) Int. Cl.
*B65B 35/30* (2006.01)
*B65B 5/10* (2006.01)
(52) U.S. Cl. .............................. 53/445; 53/474; 53/251
(58) Field of Classification Search ............... 53/155, 53/157, 252, 249, 250, 251, 445, 474

See application file for complete search history.

(56) References Cited

U.S. PATENT DOCUMENTS

| | | | |
|---|---|---|---|
| 2,781,121 A | | 2/1957 | Brandenberger |
| 3,193,981 A | * | 7/1965 | Whitecar ...................... 53/65 |
| 3,269,091 A | * | 8/1966 | Martin ......................... 53/252 |
| 3,821,874 A | * | 7/1974 | Jones ........................... 53/449 |
| 4,250,693 A | * | 2/1981 | Andersson ................... 53/543 |
| 4,492,070 A | * | 1/1985 | Morse et al. .................. 53/438 |

(Continued)

FOREIGN PATENT DOCUMENTS

DE  20 37 536  2/1972

(Continued)

*Primary Examiner*—Paul R Durand
(74) *Attorney, Agent, or Firm*—Paul Vincent

(57) ABSTRACT

The invention concerns a method for controlling a transfer device in a packaging machine. The transfer device comprises a first conveying device which is moved in cycles, a second conveying device which is moved in cycles and extends, at least in sections, parallel to the first conveying device, and a pushing device which performs a pushing motion substantially perpendicular to the transport direction of the conveying devices. A product is supplied by the first conveying device to a transfer location, is transferred by the pushing device to the second conveying device during a standstill phase of both conveying devices and subsequently further transported by the second conveying device. The pushing device is in a withdrawn position outside of the path of motion of the product disposed on the first conveying device and extends over the first conveying device and also at least partially over the second conveying device in an insertion position. Further transport of the transferred product by the second conveying device starts before the pushing device has reached its withdrawn position.

7 Claims, 6 Drawing Sheets

U.S. PATENT DOCUMENTS

| | | | |
|---|---|---|---|
| 5,052,544 A * | 10/1991 | Anderson | 198/456 |
| 5,175,976 A * | 1/1993 | Petry et al. | 53/252 |
| 5,308,223 A | 5/1994 | Sternheimer | |
| 5,457,941 A * | 10/1995 | Long et al. | 53/460 |
| 5,481,848 A * | 1/1996 | Tagliaferri et al. | 53/157 |
| 5,943,847 A * | 8/1999 | Chalendar | 53/543 |
| 6,354,060 B1 * | 3/2002 | Pluschow et al. | 53/157 |
| 6,845,860 B1 | 1/2005 | Walker | |
| 6,854,244 B2 * | 2/2005 | Pike | 53/252 |
| 6,866,140 B2 | 3/2005 | Iwasa | |
| 6,983,580 B1 * | 1/2006 | Layton et al. | 53/530 |
| 7,134,258 B2 * | 11/2006 | Kalany et al. | 53/473 |
| 7,146,784 B1 * | 12/2006 | Portrait | 53/544 |
| 7,155,877 B2 * | 1/2007 | Douglas | 53/251 |
| 7,331,161 B2 * | 2/2008 | Buchko | 53/432 |
| 7,389,622 B2 * | 6/2008 | Douglas | 53/251 |
| 2001/0039785 A1 * | 11/2001 | Greenwell et al. | 53/429 |

FOREIGN PATENT DOCUMENTS

| | | |
|---|---|---|
| DE | 27 11 132 | 9/1978 |
| DE | 42 16 824 | 12/1992 |
| DE | 199 18 527 | 10/2000 |

* cited by examiner

TRANSFER DEVICE ON A PACKAGING MACHINE AND METHOD FOR CONTROL THEREOF

This application is the national stage of PCT/EP2006/003087 filed on Apr. 5, 2006 and also claims Paris Convention priority of DE 10 2005 017 961.4 filed Apr. 19, 2005.

BACKGROUND OF THE INVENTION

The invention concerns a method for controlling a transfer device in a packaging machine, wherein the transfer device comprises a first conveying device which is moved in cycles, a second conveying device which is moved in cycles and extends, at least in sections, parallel to the first conveying device, and a pushing device which performs a pushing motion substantially perpendicular to the transport direction of the conveying devices, wherein a product is supplied to a transfer location via the first conveying device, transferred to the second conveying device by the pushing device during a standstill phase of the two conveying devices, and is subsequently further transported via the second conveying device, wherein the pushing device is in a withdrawn position outside the path of motion of the product disposed on the first conveying device, and, in an insertion position, at least partially extends over both the first conveying device and the second conveying device.

The invention also concerns a transfer device in a packaging machine, comprising a first conveying device which is moved in cycles, a second conveying device which is moved in cycles and extends at least in sections parallel to the first conveying device, and a pushing device which performs a pushing motion substantially perpendicular to the transport direction of the conveying devices, wherein a product can be supplied to a transfer location via the first conveying device, transferred to the second conveying device by the pushing device during a standstill phase of the two conveying devices, and further transported via the second conveying device.

Products must be relocated between two conveying devices of a packaging machine, or transferred from one conveying device to a second conveying device. The conveying devices are usually endless circulating conveying belts or chains which are moved in cycles. In the following example, the first conveying device is the so-called product chain for supplying a product to a transfer location, and the second conveying device is the so-called folded box chain for supplying a package or a folded box to the transfer location. The invention is, however, not limited to the above-mentioned conveying devices, but can also be applied to different types of transfer of a product between two conveying devices, which are driven in cycles, within a packaging machine.

The product chain sequentially supplies a continuous row of a plurality of similar products to the transfer location. A plurality of erected, similar folded boxes are correspondingly sequentially supplied in a continuous row to the transfer location via the folded box chain. The cycled drive motions of the product chain and the folded box chain, which extend parallel to each other at least at the transfer location, are synchronized by using a common drive, such that, at the transfer location, the product can be pushed from the product chain onto the adjacent folded box chain by a pushing device during a standstill phase of the drive motions, and be pushed into the open package at that location. As soon as the pushing device has returned into its withdrawn rest position and is positioned outside of the path of motion of the product chain and the folded box chain, the two chains are advanced and moved on by one motion cycle.

Modern packaging machines operate at very high cycle rates, such that one working or motion cycle may take only a few milliseconds. The packaging machine is consequently subjected to relatively great dynamic loads, since the masses to be moved must be quickly accelerated, decelerated, and stopped. In particular, the folded box containing the product may have a relatively large mass which produces vibrations resulting in unstable operation of the packaging machine during operation at high cycle rates.

Handling of the package containing the product subsequent to product transfer, i.e. downstream of the transfer device, may also be problematic due to the relatively short cycle times, since subsequent closing of the package requires a highly dynamic closing motion and only a very short time is available to remove the package containing the product from the packaging machine.

In order to eliminate the above-mentioned dynamics problems, the cycle rate has been reduced, thereby reducing the speed of motion of the product chain and the folded box chain with the disadvantageous consequence that the efficiency of the packaging machine is greatly reduced.

It is the underlying purpose of the invention to provide a method for controlling a transfer device in a packaging machine which reduces the dynamic loads in the packaging machine without reducing the efficiency of the packaging machine, and a transfer device for performing the method in a simple fashion.

SUMMARY OF THE INVENTION

The object in view of the method is achieved by the characterizing features of the independent claims. The second conveying device thereby continues transport of the product before the pushing device has reached its withdrawn position.

The invention is based on the fundamental idea of decoupling the transport motions of the first conveying device and the second conveying device. In this fashion, the transport motions of the two conveying devices can start at different times and, in particular, the second conveying device may precede the first conveying device and thereby be operated at a slower speed than the first conveying device, which prevents excessive dynamic loads caused by the masses transported by the second conveying device.

The pushing device, which may e.g. be a plunger, advantageously inserts the product into a package, in particular a folded box, which is supplied by the second conveying device, and the product and package are subsequently further transported by the second conveying device. During insertion, the pushing device, which is disposed on the side of the first conveying device facing away from the second conveying device, abuts the product disposed on the first conveying device, thereby pushing it transversely to the transport direction of the conveying devices onto the second conveying device and into the open package provided at that location. At the end of the insertion motion in the so-called insertion position, the pushing device or plunger extends completely over the first conveying device and partially over the second conveying device, thereby engaging the package. In this insertion position, the pushing device blocks the transport motion of the conveying devices, which therefore remain in their standstill phases. The pushing device is then withdrawn by initially removing it from the package and out of the region of the second conveying device.

In a further development of the invention, further transport of the package containing the product is initiated by the second conveying device as soon as the pushing device is outside of the path of motion of the package disposed on the second conveying device. The second conveying device may alternatively start further transport as soon as the pushing device has left the second conveying device.

The transport motion of the first conveying device can start only when the pushing device is outside of the path of motion of the product disposed on the first conveying device, i.e. has been withdrawn by the first conveying device. The first conveying device is moved at a higher speed than the second conveying device, such that the two conveying devices simultaneously assume positions which permit transfer of a further product.

In a preferred embodiment of the invention, a leaflet is provided at the transfer location between the product and the package, which is carried along by the product during insertion into the package, wherein the leaflet is supplied via a leaflet conveying device which is driven in cycles. The leaflet conveying device is moved further as soon as the pushing device is outside of the path of motion of the package disposed on the second conveying device and outside of the path of motion of the leaflet conveying device. The leaflet conveying device may also have its own drive. In order to minimize the number of required drives, the second conveying device and the leaflet conveying drive may have a common drive to synchronize the motions of the second conveying device and the leaflet conveying device.

The above-mentioned object in view of the transfer device is preferably achieved in that separate drives are provided for the first and second conveying devices, in particular, in the form of servomotors, and the first conveying device is moved at a higher speed than the second conveying device.

Further details and features of the invention can be extracted from the following description of an embodiment with reference to the drawing.

DESCRIPTION OF THE PREFERRED EMBODIMENT

Figure 1:
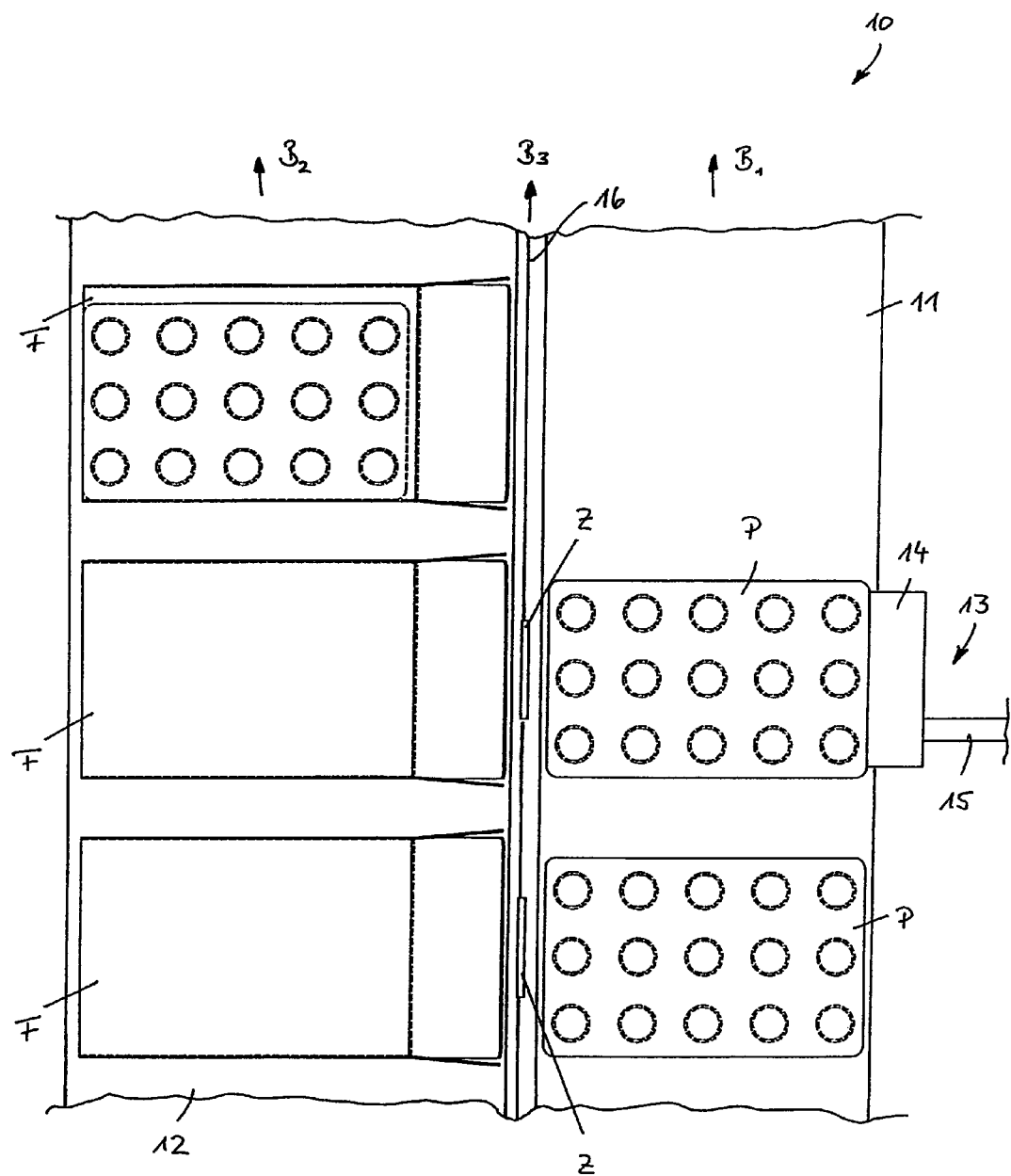
FIG. 1 shows a view onto a transfer device in the initial position of a transfer cycle.

A transfer device 10 which is schematically shown in FIG. 1 comprises a first endless circulating conveying device 11 in the form of a so-called product chain which is driven in cycles and sequentially supplies a plurality of products P, which are disposed in a row and at mutual separations from each other, to the transfer device.

A second conveying device 12 extends parallel to the first conveying device 11 in the form of a so-called folded box chain which sequentially supplies a plurality of erected folded boxes F, which are disposed in a row and at mutual separations from each other, to the transfer device. The folded boxes are open on their side facing the first conveying device 11 (FIG. 1).

A leaflet conveying device 16 extends between the first conveying device 11 and the second conveying device 12, which sequentially supplies a plurality of leaflets Z, which are disposed in a row and at mutual separations from each other, to the transfer device 10. The first conveying device 11, the second conveying device 12, and the leaflet conveying device 16 are all moved in cycles in the same direction (in an upward direction in FIG. 1), as indicated by arrows $B_1$, $B_2$ and $B_3$.

A pushing device 13 is disposed on the side of the first conveying device 11 facing away from the second conveying device 12 and leaflet conveying device 16, which has a connecting rod 15 with a pushing piece 14 at its end. The pushing device 13 can be moved perpendicularly to the transport direction of the conveying devices 11, 12 and 16, i.e. from the right to the left in FIG. 1, and be withdrawn again into its initial position.

FIG. 1 shows the initial position of a transfer cycle or operation. The conveying devices 11, 12 and 13 are in a standstill phase, wherein the product P is aligned with the opening of the folded box F, and the leaflet Z is located between the product P and the folded box F. The pushing device 13 abuts the product P on the side of the product P facing away from the folded box F.

Figure 6:
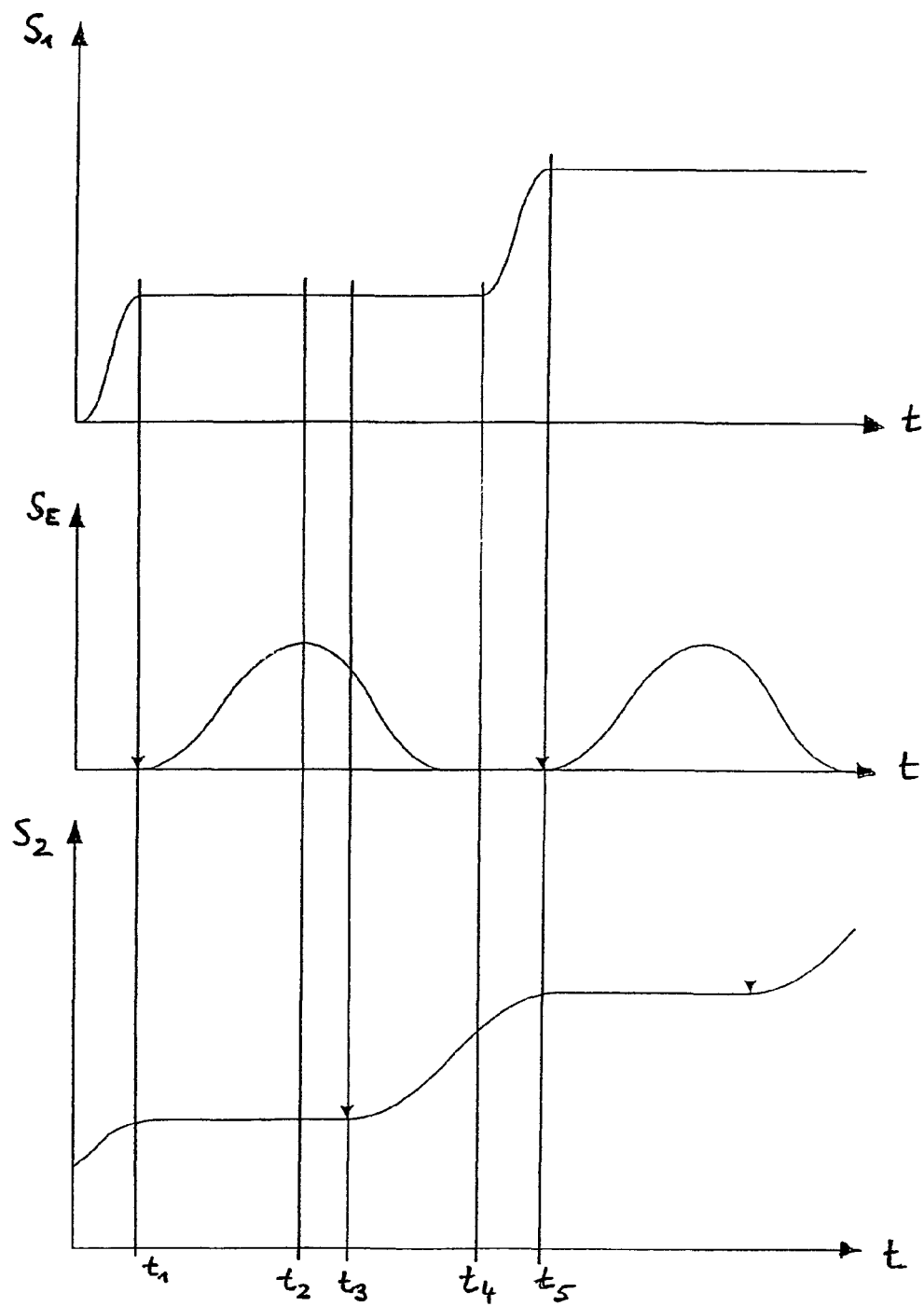
FIG. 6 shows three path-time diagrams of the course of motion of the first conveying device, the pushing device and the second conveying device.

FIG. 6 shows three path-time diagrams, wherein the upper diagram shows the path $S_1$ of the first conveying device 11, and the lower diagram $S_2$ of the second conveying device 12. The central diagram shows the path $S_E$ of the pushing device 13. The initial position of FIG. 1 corresponds to the state shown in FIG. 6 at time $t_1$, i.e. the first conveying device 11 and the second conveying device 12 are each at the start of a rest or standstill phase, while the pushing device 13 is in its withdrawn position ($S_E$=0).

Figure 2:
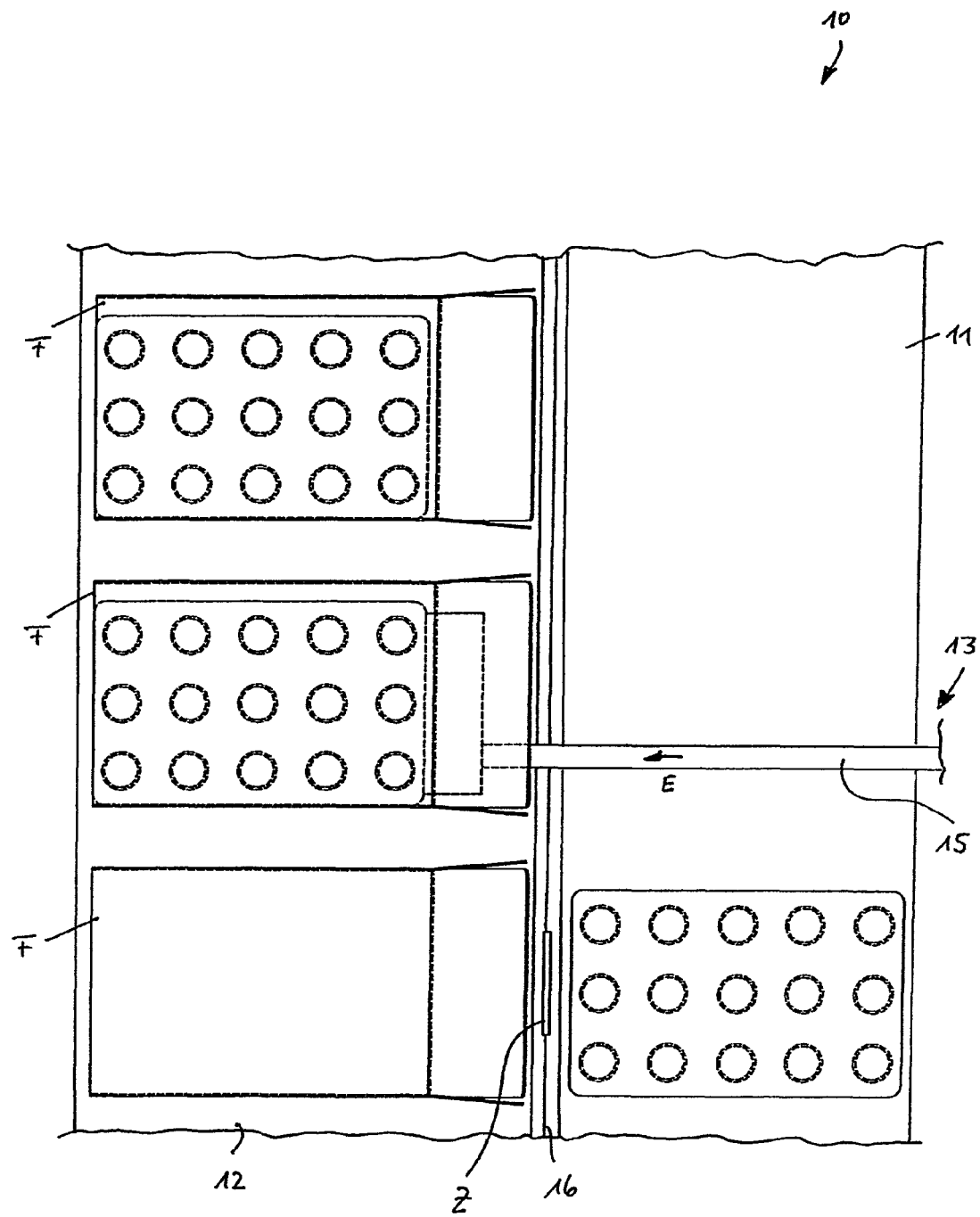
FIG. 2 shows the transfer device of FIG. 1 after insertion of the product into the package.

While the conveying devices 11 and 12 and thereby also the leaflet conveying device 13 have stopped, the pushing device 13 is activated and pushes the product P transversely to the longitudinal direction of the first conveying device 11 into the folded box F, wherein the leaflet Z is carried along and is also pushed into the folded box (see arrow E in FIG. 2). FIG. 2 shows the state at time $t_2$ (FIG. 6), in which the product P is inserted into the folded box F and the pushing device 13 is in its insertion position ($S_E$=max).

Figure 3:
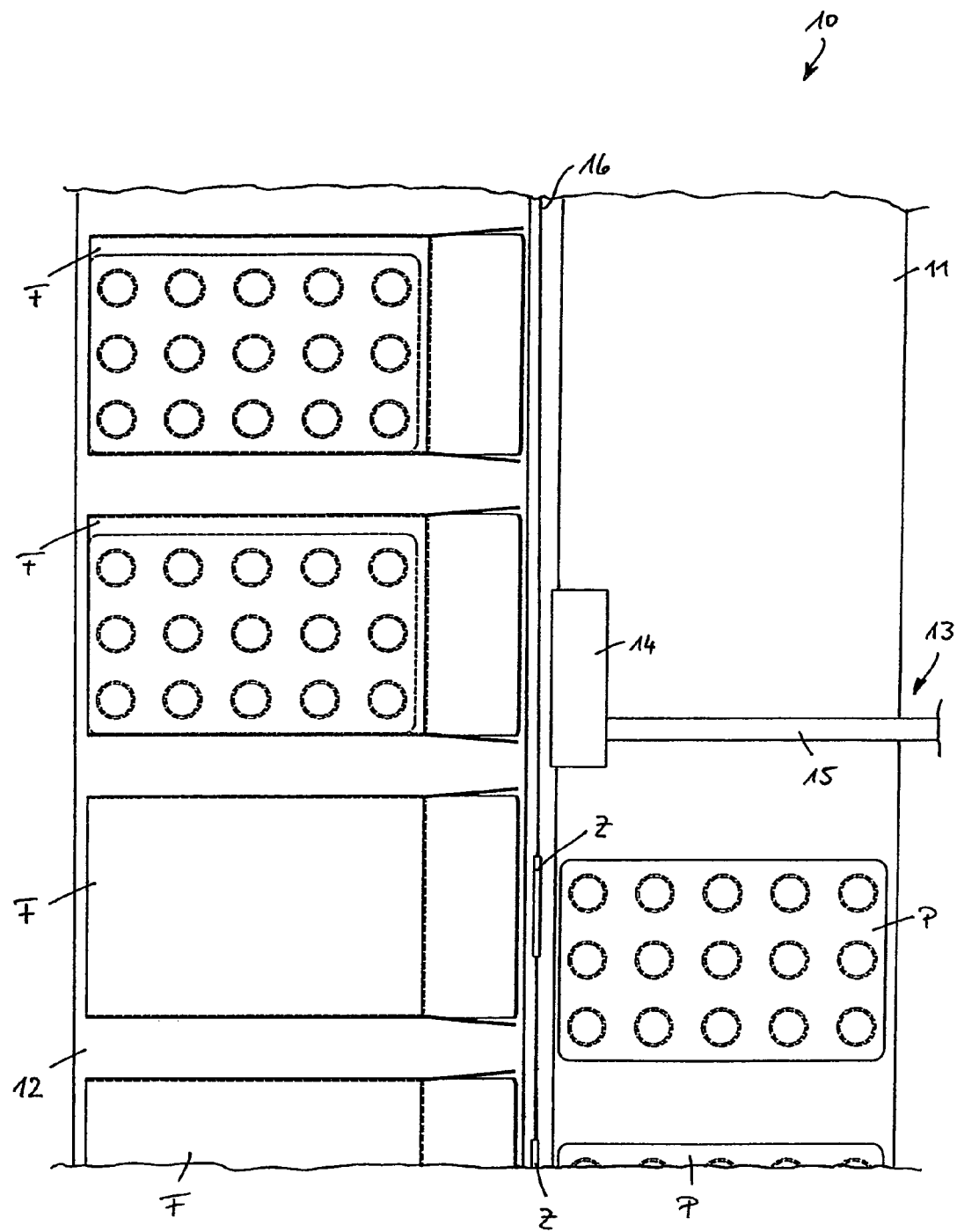
FIG. 3 shows the transfer device of FIG. 2 during removal of the pushing device.

The pushing device 13 is moved from the insertion position (FIG. 2) into the withdrawn position (FIG. 1). The pushing piece 14 is thereby initially removed from the folded box F and then from the second conveying device 12, and is disposed on the side of the path of motion of the leaflet conveying device 16 facing away from the folded box F, directly next to the leaflet conveying device 13 at time $t_3$ (FIG. 3). At time $t_3$, the transport motion of the second conveying device 12 already starts with a relatively slow speed as shown in the lower diagram of FIG. 6. The leaflet conveying device 16 is preferably synchronized with the second conveying device 12, which have a common drive, thereby also moving along the leaflet conveying device 16.

Figure 4:
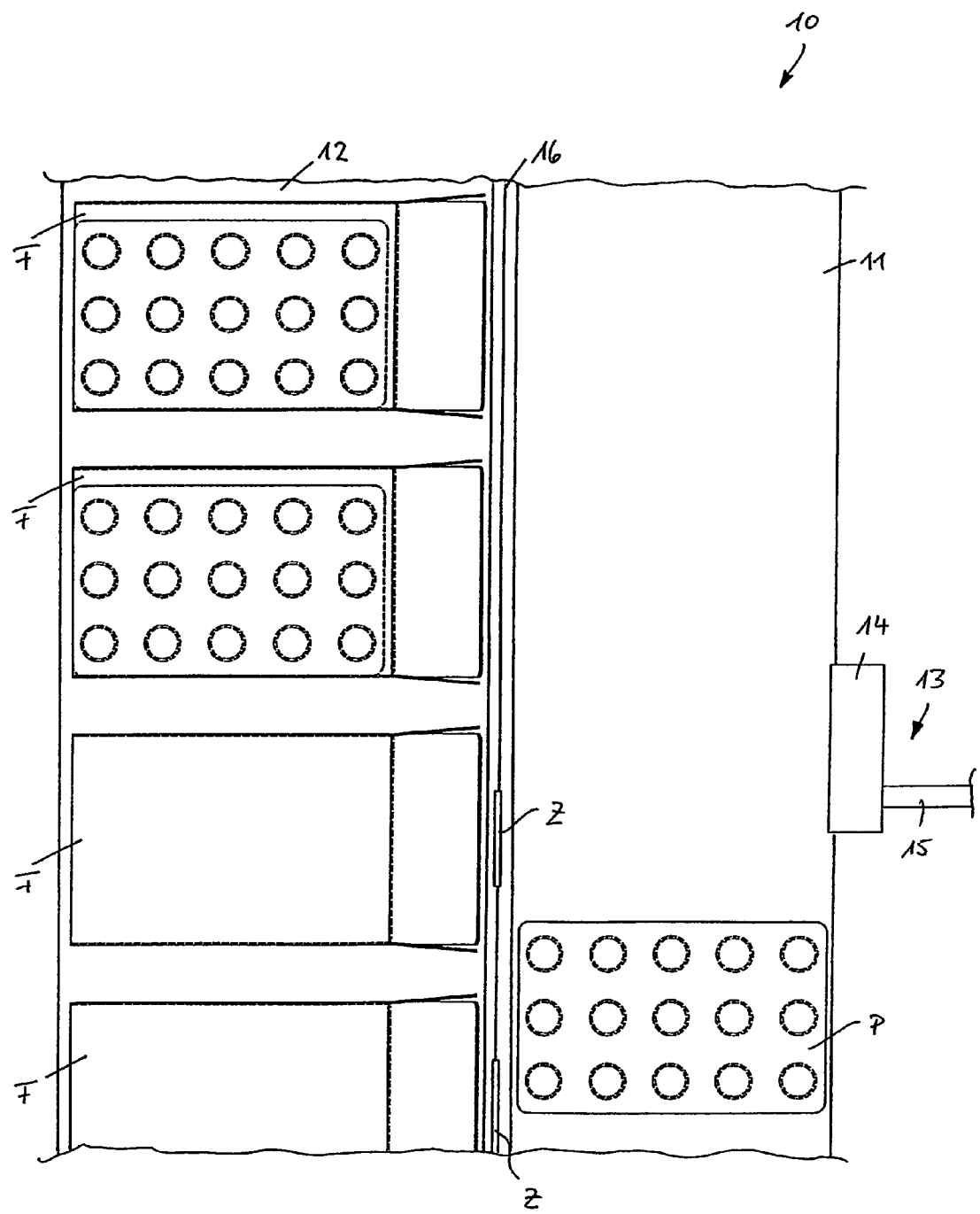
FIG. 4 shows the transfer device of FIG. 3 with withdrawn pushing device.
Figure 5:
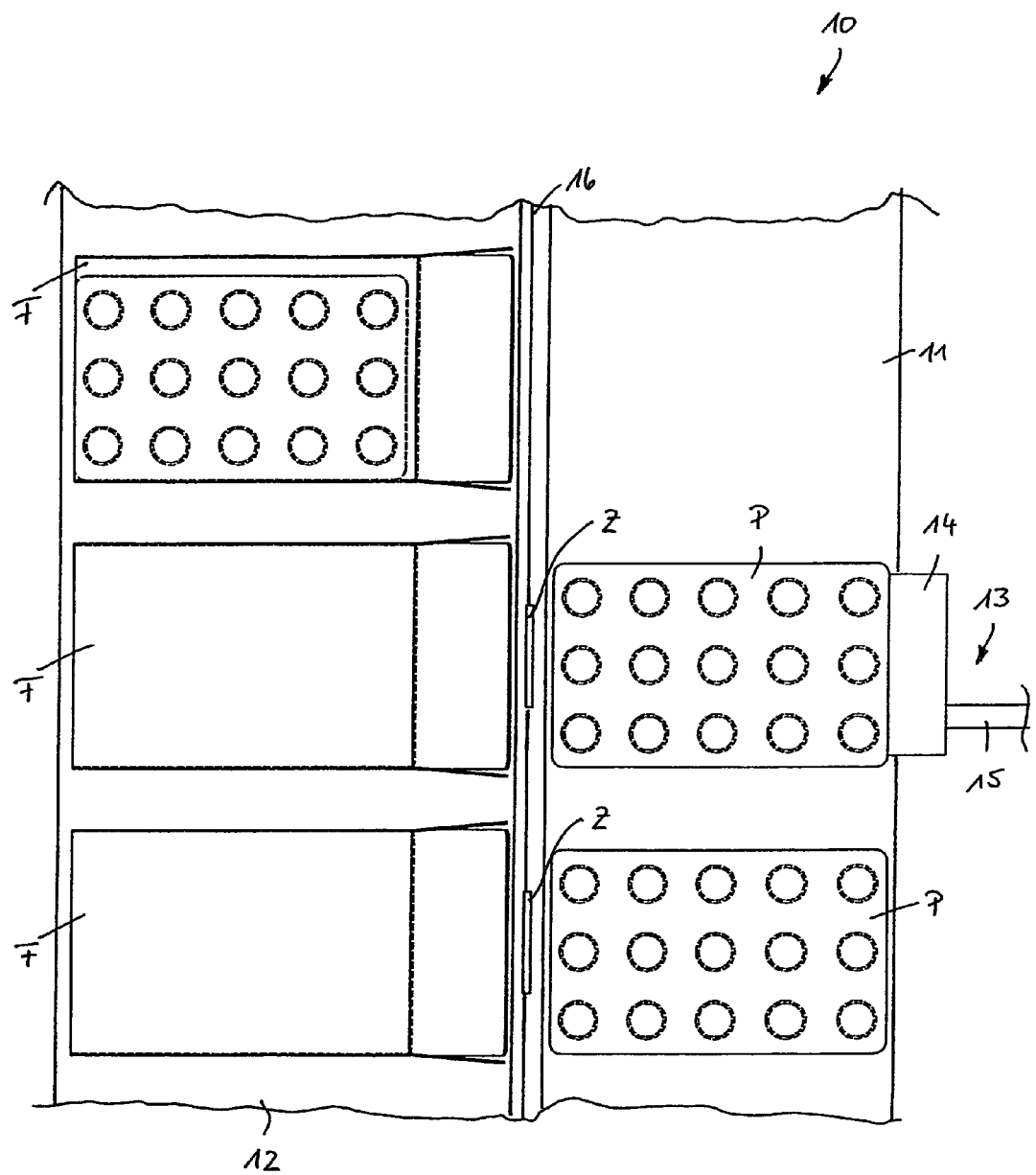
FIG. 5 shows the transfer device of FIG. 4 at the start of a new transfer cycle.

The first conveying device 11 remains in its standstill phase until the pushing device 13 has reached its withdrawn position outside of the path of motion of the product P disposed on the first conveying device 11 at time $t_4$. This state is shown in FIG. 4. Starting from time $t_4$, the first conveying device 11 is also moved further and follows the second conveying device 12 and the leaflet conveying device 16 at a higher speed, as shown in the upper diagram of FIG. 6. At time $t_5$, all three conveying devices 11, 12, and 16 return to the initial position for the subsequent transfer cycle or process shown in FIG. 5, which corresponds to the position shown in FIG. 1. The above-described processes are then repeated.

As is shown, in particular, in FIG. 6, the time period between times $t_3$ and $t_5$ for an advance motion of a working cycle provided for the second conveying device 12 and the leaflet conveying device 16 is much longer compared to that between times $t_4$ and $t_5$ for the first conveying device 11. The folded box F filled with the product P and the leaflet Z, which has a relatively large mass, can thereby be moved through the second conveying device 12 with a slower speed than the first conveying device 11 to prevent disadvantageous dynamic impair of the packaging machine operation without reducing the number of cycles of the packaging machine.

We claim:

1. A method for controlling a transfer device in a packaging machine, the transfer device comprising a first conveying device which is moved in cycles to transport a product to a transfer location, a second conveying device which is moved in cycles, the second conveying device extending parallel to the first conveying device at the transfer location, and a pushing device disposed at the transfer location to exercise a pushing motion which is substantially perpendicular to a transport direction of the first and second conveying devices at the transfer location, the method comprising the steps of:
   a) stopping the first and second conveying devices;
   b) moving the pushing device to urge the product from the first conveying device onto the second conveying device;
   c) retracting the pushing device following transfer of the product to the second conveying device; and
   d) initiating motion of the second conveying device during step c) while the first conveying device is still stationary.

2. The method of claim 1, wherein the first conveying device and the second conveying device have separated drives, the first conveying device being moved at a higher speed than the second conveying device.

3. The method of claim 1, wherein the product is inserted by the pushing device into a package or into a folded box, which is supplied by the second conveying device and which is subsequently further transported with package by the second conveying device.

4. The method of claim 3, wherein the second conveying device already starts further transport of the package containing the product when the pushing device is outside of a path of motion of the package disposed on the second conveying device.

5. The method of claim 3, wherein a leaflet is disposed between the product and the package at the transfer location and is carried along by the product during insertion into the package, the leaflet being supplied by a leaflet conveying device which is driven in cycles, wherein the leaflet conveying device is further moved as soon as the pushing device is outside a path of motion of the package disposed on the second conveying device.

6. The method of claim 5, wherein motions of the second conveying device and of the leaflet conveying device are synchronized.

7. The method of claim 5, wherein the second conveying device and the leaflet conveying device have a common drive.

* * * * *